United States Patent
Westfall et al.

(10) Patent No.: US 6,827,749 B2
(45) Date of Patent: Dec. 7, 2004

(54) CONTINUOUS PROCESS FOR MAKING AN AQUEOUS HYDROCARBON FUEL EMULSIONS

(75) Inventors: David L. Westfall, Lakewood, OH (US); John J. Mullay, Mentor, OH (US); Stephen P. Rowan, Mentor, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 586 days.

(21) Appl. No.: 09/977,747

(22) Filed: Oct. 15, 2001

(65) Prior Publication Data

US 2002/0116868 A1 Aug. 29, 2002

Related U.S. Application Data

(63) Continuation-in-part of application No. 09/761,482, filed on Jan. 16, 2001, now Pat. No. 6,419,714, which is a continuation of application No. 09/755,577, filed on Jan. 5, 2001, now abandoned, which is a continuation-in-part of application No. 09/731,173, filed on Dec. 6, 2000, now Pat. No. 6,530,964, which is a continuation-in-part of application No. 09/483,481, filed on Jan. 14, 2000, now Pat. No. 6,383,237, which is a continuation-in-part of application No. 09/390,925, filed on Sep. 7, 1999, now Pat. No. 6,368,367, which is a continuation-in-part of application No. 09/349,268, filed on Jul. 7, 1999, now Pat. No. 6,368,366.

(51) Int. Cl.⁷ .............................................. C10M 1/32
(52) U.S. Cl. ........................................... 44/301; 44/302
(58) Field of Search ............................................ 44/301

(56) References Cited

U.S. PATENT DOCUMENTS

| 2,619,330 A | 11/1952 | Willems |
| 2,858,200 A | 10/1958 | Broughten |
| 3,499,632 A | 3/1970 | Piros |
| 3,756,794 A | 9/1973 | Ford |
| 3,818,876 A | 6/1974 | Voogd |
| 3,855,103 A | 12/1974 | McLaren et al. |
| 3,876,391 A | 4/1975 | McCoy et al. |
| 4,048,080 A | 9/1977 | Lee et al. |
| 4,084,940 A | 4/1978 | Lissant |
| 4,138,281 A | 2/1979 | Olney et al. .................... 149/2 |
| 4,146,499 A | 3/1979 | Rosano |
| 4,207,078 A | 6/1980 | Sweeney et al. |
| 4,329,249 A | 5/1982 | Forsberg |
| 4,388,893 A | 6/1983 | Apfel |
| 4,433,917 A | 2/1984 | Mendel et al. |
| 4,438,731 A | 3/1984 | Maggio |
| 4,447,348 A | 5/1984 | Forsberg |
| 4,452,712 A | 6/1984 | Laemmle |
| 4,482,356 A | 11/1984 | Hanlon |
| 4,561,861 A | 12/1985 | Davis et al. |

(List continued on next page.)

FOREIGN PATENT DOCUMENTS

| WO | WO 99/13028 | 3/1999 |
| WO | WO 99/13029 | 3/1999 |
| WO | WO 99/13030 | 3/1999 |
| WO | WO 99/13031 | 3/1999 |
| WO | WO 99/63025 | 12/1999 | ..................... 1/32 |

OTHER PUBLICATIONS

McCutcheon's Emulsifiers & Detergents, 1998, pp. 1–235 of the North American Edition, and pp. 1–199 of the International Edition (Copyright laws prohibit copying).

Emulsions and Foams, 1941, Berkman et al., pp. 198, Reinhold Publishing Corporation, NY, NY.

(List continued on next page.)

Primary Examiner—Ellen M. McAvoy
(74) Attorney, Agent, or Firm—Teresan W. Gilbert; Michael F. Esposito (57) ABSTRACT

An aqueous hydrocarbon fuel is produced by a batch or continuous process. The process employs a reactant emulsion as a starting component with a hydrocarbon fuel, emulsifier and water. The resulting aqueous hydrocarbon fuel emulsion has improved stability.

23 Claims, 2 Drawing Sheets

U.S. PATENT DOCUMENTS

| | | |
|---|---|---|
| 4,585,461 A | 4/1986 | Gorman |
| 4,613,341 A | 9/1986 | Zaweski et al. |
| 4,621,927 A | 11/1986 | Hiroi |
| 4,647,212 A | 3/1987 | Hankison ................... 366/165 |
| 4,697,929 A | 10/1987 | Muller |
| 4,708,753 A | 11/1987 | Forsberg |
| 4,776,977 A | 10/1988 | Taylor |
| 4,884,620 A | 12/1989 | Jhaveri et al. ................ 164/15 |
| 4,892,562 A | 1/1990 | Bowers et al. |
| 4,908,154 A | 3/1990 | Cook et al. |
| 4,916,631 A | 4/1990 | Crain et al. |
| 4,938,606 A | 7/1990 | Kunz |
| 4,953,097 A | 8/1990 | Crain et al. |
| 4,983,319 A | 1/1991 | Gregoli et al. |
| 4,986,858 A | 1/1991 | Oliver et al. |
| 5,000,757 A | 3/1991 | Puttock et al. |
| 5,104,621 A | 4/1992 | Pfost et al. |
| 5,279,626 A | 1/1994 | Cunningham et al. |
| 5,352,377 A | 10/1994 | Blain et al. |
| 5,389,111 A | 2/1995 | Nikanjam et al. |
| 5,389,112 A | 2/1995 | Nikanjam et al. |
| 5,399,293 A | 3/1995 | Nunez et al. |
| 5,404,841 A | 4/1995 | Valentine |
| 5,411,558 A | 5/1995 | Taniguchi et al. |
| 5,445,656 A | 8/1995 | Marelli |
| 5,454,964 A | 10/1995 | Blackborow et al. |
| 5,478,365 A | 12/1995 | Nikanjam et al. |
| 5,501,714 A | 3/1996 | Valentine et al. |
| 5,503,772 A | 4/1996 | Rivas et al. |
| 5,544,856 A | 8/1996 | King et al. |
| 5,556,574 A | 9/1996 | Rivas et al. |
| 5,563,189 A | 10/1996 | Hosokawa et al. |
| 5,584,326 A | 12/1996 | Galli |
| 5,622,920 A | 4/1997 | Rivas et al. |
| 5,624,999 A | 4/1997 | Lombardi et al. |
| 5,632,596 A | 5/1997 | Ross |
| 5,643,528 A | 7/1997 | Le Gras |
| 5,669,938 A | 9/1997 | Schwab |
| 5,682,842 A | 11/1997 | Coleman et al. |
| 5,706,896 A | 1/1998 | Tubel et al. |
| 5,743,922 A | 4/1998 | Peter-Hoblyn et al. |
| 5,746,783 A | 5/1998 | Compere et al. |
| 5,792,223 A | 8/1998 | Rivas et al. |
| 5,851,245 A | 12/1998 | Moriyama et al. |
| 5,862,315 A | 1/1999 | Glaser et al. |
| 5,863,301 A | 1/1999 | Grosso et al. |
| 5,868,201 A | 2/1999 | Bussear et al. |
| 5,873,916 A | 2/1999 | Cemenska et al. |
| 5,879,079 A | 3/1999 | Hohmann et al. |
| 5,879,419 A | 3/1999 | Moriyama et al. |
| 5,895,565 A | 4/1999 | Steininger et al. |
| 5,896,292 A | 4/1999 | Hosaka et al. |
| 6,280,485 B1 * | 8/2001 | Daly et al. ..................... 44/301 |
| 6,368,366 B1 * | 4/2002 | Langer et al. ................ 44/301 |
| 6,368,367 B1 * | 4/2002 | Langer et al. ................ 44/301 |
| 6,383,237 B1 * | 5/2002 | Langer et al. ................ 44/301 |
| 6,419,714 B2 * | 7/2002 | Thompson et al. ........... 44/301 |
| 6,530,964 B2 * | 3/2003 | Langer et al. ................ 44/301 |
| 6,648,929 B1 * | 11/2003 | Daly et al. ..................... 44/301 |
| 6,652,607 B2 * | 11/2003 | Langer et al. ................ 44/301 |

OTHER PUBLICATIONS

Claytons The Theory of Emulsions and Their Technical Treatment, $5^{th}$ Edition, Chapter XII, pp. 529, Chemical Publishing Co., Inc. NY, NY.

Kady International; Continuous Flow Dispersion Mills; 2–98; 5 pages (brochure).

Ika, Inc.; Batch Mixers, A Closer Look (www.silverson.com/btchmxr2.htm); Mar. 18, 1999 (printed from internet); 4 pages.

Sonic Corp.; Tri–Homo Colloid Mills, catalog TH980; 4 pages.

* cited by examiner

Figure 1

Figure 2

CONTINUOUS PROCESS FOR MAKING AN AQUEOUS HYDROCARBON FUEL EMULSIONS

This is a continuation in part of U.S. application Ser. No. 09/731,173 filed Dec. 6, 2000, now U.S. Pat. No. 6,530,964, which is a continuation in part of Ser. No. 09/483,481 filed Jan. 14, 2000, now U.S. Pat. No. 6,383,237, which is a continuation in part of U.S. application Ser. No. 09/390,925 filed Sep. 7, 1999, now U.S. Pat. No. 6,368,367, which is a continuation in part of U.S. application Ser. No. 09/349,268 filed Jul. 7, 1999, now U.S. Pat. No. 6,368,366, and which is a continuation in part of Ser. No. 09/761,482 filed Jan. 16, 2001, now U.S. Pat. No. 6,419,714, which is a continuation of Ser. No. 09/755,577 filed Jan. 5, 2001 now abandoned. All of the disclosures in the prior applications are incorporated herein by reference in their entirety.

TECHNICAL FIELD

The invention relates to a process for making aqueous hydrocarbon fuel emulsions from a continuous or batch process with good stability. More particularly, the invention relates to a process for making an aqueous hydrocarbon fuel emulsion by employing an initial emulsion as one of the reactants in the process.

BACKGROUND OF THE INVENTION

Internal combustion engines, especially diesel engines, that employ water mixed with the fuel in the combustion chamber can produce lower nitrogen oxides (NOx), hydrocarbons and particulate emissions per unit of power output. The reduction of nitrogen oxides is an environmental issue because they contribute to smog and air pollution. Governmental regulations and environmental concerns have driven the need to reduce NOx emissions from engines.

Diesel-fueled engines produce NOx due to the relatively high flame temperatures reached during combustion. The reduction of NOx production conventionally includes the use of catalytic converters, using "clean" fuels, recirculation of exhaust and engine timing changes. These methods are typically expensive or complicated to be readily commercially available.

Water is inert toward combustion, but lowers the peak combustion temperature resulting in reduced particulates and NOx formation. When water is added to the fuel it forms an emulsion and these emulsions are generally unstable. Stable water in fuel emulsions of small particle size is difficult to reach and maintain.

Stable water in fuel macroemulsions of small particles size are difficult to make. It would be advantageous to develop a process to make water in fuel macroemulsions in which a batch process did not need a statistical number of tank turnovers to produce a 1.0 micron or less water in fuel emulsion. Further, it would be advantageous to produce submicron mean average particles in a water in fuel macroemulsion by a continuous process.

It has been found that including an emulsion as an initial component with the water fuel and emulsifier in a batch or continuous process produces an improved stable water in fuel macroemulsion with a mean average particle size distribution of 1 micron or less.

The term "NOx" is used herein to refer to any of the nitrogen oxides, NO, $NO_2$, $N_2O$, or mixtures of two or more thereof. The terms "aqueous hydrocarbon fuel emulsion" and "water fuel emulsion" are interchangeable. The terms "aqueous hydrocarbon fuel" and "water fuel blend" are interchangeable.

SUMMARY OF THE INVENTION

The invention relates to a batch or continuous process for making an aqueous hydrocarbon fuel emulsion comprising: emulsifying (a) a liquid hydrocarbon fuel, water and at least one emulsifier, (b) a reactant emulsion of the liquid hydrocarbon fuel, water and at least one emulsifier, and (c) water, under emulsification conditions to form an aqueous hydrocarbon fuel emulsion.

The aqueous hydrocarbon fuel is an emulsion comprised of water, fuel and an emulsifier. The emulsifier comprises:

(i) at least one fuel-soluble product made by reacting at least one hydrocarbyl-substituted carboxylic acid acylating agent with ammonia or an amine, the hydrocarbyl substituent of said acylating agent having about 50 to about 500 carbon atoms;

(ii) at least one of an ionic or a nonionic compound having a hydrophilic-lipophilic balance (HLB) of about 1 to about 40;

(iii) a mixture of (ii) with (i);

(iv) a water-soluble compound selected from the group consisting of amine salts, ammonium salts, azide compounds, nitrate esters, nitramine, nitrocompounds, alkali metal salts, alkaline earth metal salts, in combination with (i), (ii), (iii), (v), (vii) or combinations thereof;

(v) the reaction product of polyacidic polymer with at least one fuel soluble product made by reacting at least one hydrocarbyl-substituted carboxylic acid acylating agent with ammonia, an amine, a polyamine, alkanol amine, or hydroxy amines;

(vi) an amino alkylphenol which is made by reacting an alkylphenol, an aldehyde and an amine resulting in an amino alkylphenol, or (vii) the combination of (vi) with (i), (ii), (iii), (iv), (v) or combinations thereof.

The aqueous hydrocarbon fuel emulsion includes a discontinuous aqueous phase in a continuous fuel phase. The discontinuous aqueous phase comprises aqueous droplets having a mean diameter of 1.0 micron or less. Furthermore, the use of an emulsion as an initial component in the batch or continuous process has improved the efficiency of the process and the stability of aqueous hydrocarbon emulsions for use as aqueous hydrocarbon fuel emulsion.

The Process

The invention provides for a batch or continuous process for making an aqueous hydrocarbon fuel by forming a stable emulsion in which the water is suspended in a continuous phase of fuel and wherein the water droplets have a mean diameter of 1.0 micron or less. The droplet size is in volume.

In the practice of the present invention the aqueous hydrocarbon fuel emulsion is made by a batch or a continuous process capable of monitoring and adjusting the flow rates of the reactant emulsion, fuel, emulsifier, additives and/or water to form a stable emulsion with the desired water droplet size.

The batch process as described herein depicts one embodiment of the invention. The hydrocarbon fuel, emulsifier, and reactant emulsion are added to a vessel. The water is added to the vessel or, in the alternative is added close to the entry portal of the emulsification device, which is external to the vessel. In the batch process the following components are emulsified:

(1) about 10% to about 90% by weight of the fuel and about at least 0.1% to about 25% by weight of emulsifier, (2) about 1% to about 90% by weight of a reactant emulsion, and (3) about 1% to about 50% by weight of water, wherein the water contains about 0% to about 30% by weight of the aqueous hydrocarbon emulsion.

The ratio of fuel, water and emulsifier to reactant emulsion is about 1 to about 99, in another embodiment about 15 to about 85, in another embodiment about 40 to about 60, in another embodiment about 99 to about 1, in another embodiment about 85 to about 15, in another embodiment about 60 to about 40, and in another embodiment 50 to about 50.

The mixture is emulsified using an emulsification device in the vessel, or alternatively the mixture flows from the vessel via a circular line to the emulsification device which is external to the vessel, for about 1 to about 20 tank turnovers, at a temperature in the range of about ambient temperature to about 212° F., and in another embodiment in the range of about 40° F. to about 150° F., and at a pressure in the range of about atmospheric pressure to about 10 atmospheres, in another embodiment about atmosphere pressure to about 60 psi, in another embodiment in the range of about 10 psi to about 40 psi, resulting in stable aqueous hydrocarbon fuel emulsion with a mean droplet size of less than 1.0 micron, and in another embodiment in the range of about 1.0 micron to about 0.1 micron.

EXAMPLES 1–4

These examples are illustrations of making the hydrocarbon fuel emulsion product by a batch process. The blending equipment consists of a five-million-gallon-per-year batch blender.

Batch No. 1, using a 3:1 volume/volume ratio of raw material components to reactant emulsion:

1. A 25 gallon batch of hydrocarbon fuel emulsion was prepared using about 19.9 gallons of diesel fuel, about 4.4 gallons of water, and about 0.7 gallons of emulsifier A, which is the following:

|  | Concentrate % by weight |
|---|---|
| Emulsifier 1 | 40.00 |
| Emulsifier 2 | 7.14 |
| Emulsifier 3 | 19.80 |
| 2-ethylhexylnitrate | 23.80 |
| Ammonium Nitrate (54% by weight in water) | 9.26 |

Emulsifier 1: Reaction product of dimethylethanolamine and PIBSA (Mn-2000)
Emulsifier 2: Reaction product of dimethylethanolamine and hexadeclysuccinnic anhydride
Emulsifier 3: Reaction product of an ethylene polyamine and PIBSA (Mn-1000)

This 25 gallons was left in the processing tank to serve as the reactant emulsion for the next batch.

2. About 59.6 gallons of diesel fuel was added to the processing tank followed by about 2.1 gallons of emulsifier A.

3. The reactant emulsion, diesel fuel, and emulsifier A were circulated through an IKA high shear mixer for about 30 seconds and back to the processing tank.

4. Following about 30 second mix and while continuing to circulate through the mixer, a total of about 13.3 gallons of water were added through a charging line immediately upstream of the mixer. The water feed time was about 85 seconds.

5. Once all water was added, the mixture continued to circulate through the IKA mixer for about an additional 12 minutes and 36 seconds.

6. Samples of emulsion were taken from the processing tank at various time intervals during this mix period representing 1, 2, 4, 7 and 9 tank turnovers. A tank turnover is defined as the duration to pump 100 gallons through the mixer.

7. The results are found in Table I.

Batch No. 2, using a 1:1 volume/volume ratio of raw material components to reactant emulsion.

1. A 50.1 gallon batch of hydrocarbon fuel emulsion was prepared using about 39.8 gallons of diesel fuel, about 8.9 gallons of water, and about 1.4 gallons of emulsifier A. This 50.1 gallons were left in the processing tank to serve as the reactant emulsion for the next batch.

2. About 39.7 gallons of diesel fuel was added to the processing tank followed by about 1.4 gallons of emulsifier A.

3. The reactant emulsion, diesel fuel and emulsifier A were circulated through the IKA high-shear mixer for about 30 seconds and back to the processing tank.

4. Following about 30 second mix and while continuing to circulate through the mixer, a total of about 8.8 gallons of water was added through a charging line immediately upstream of the mixer. The water feed time was about 56 seconds.

5. Once all water was added, the mixture continued to circulate through the IKA mixer for about an additional 12 minutes and 36 seconds.

6. Samples of emulsion were taken from the processing tank at various time intervals during this mix period representing 1, 2, 4, 7 and 9 tank turnovers. A tank turnover is defined as the duration to pump 100 gallons through the mixer.

7. The results are found in Table I.

Batch No. 3, using a 3:1 volume/volume ratio of raw material components to reactant emulsion. A concentrated emulsion formula was used for this example whereby approximately 85% volume of the formula amount of diesel fuel was omitted during the processing.

1. A 25.1 gallon batch of concentrated aqueous hydrocarbon fuel emulsion was prepared using about 8.6 gallons of CARB diesel fuel, about 14.2 gallons of water and about 2.3 gallons of emulsifier A. About 25.1 gallons were left in the processing tank to serve as the reactant emulsion for the next batch.

2. About 25.6 gallons of CARB diesel fuel were added to the processing tank followed by about 6.6 gallons of emulsifier A.

3. The reactant emulsion, diesel fuel and emulsifier A were circulated through the IKA high shear mixer for about 30 seconds and back to the processing tank.

4. Following about 30 second mix and while continuing to circulate through the mixer, a total of about 42.7 gallons of water were added through a charging line immediately upstream of the mixer.

5. Once all water was added, the mixture continued to circulate through the IKA mixer for about an additional 16 minutes.

6. Samples of concentrated emulsion were taken from the processing tank at various time intervals during this mix period representing 1, 2, 4, 7 and 10.4 tank turnovers. A tank turnover is defined as the duration to pump 100 gallons through the mixer.

7. The concentrated emulsion was pumped to the diluter tank and diluted with about 229.3 gallons of CARB diesel fuel.
8. The diluter tank was circulated with a centrifugal pump for about 9 minutes.
9. A sample of the aqueous hydrocarbon fuel emulsion was taken from the processing tank.
10. The results are found in Table I.

Batch No. 4, using a 1:1 volume/volume ratio of raw material components to reactant emulsion. A concentrated emulsion formula was used for this example whereby approximately 85% volume of the formula amount of diesel fuel was omitted during processing.

1. About 50.1 gallon batch of concentrated aqueous hydrocarbon fuel emulsion was prepared using about 17.1 gallons of CARB diesel fuel, about 28.5 gallons of water, and about 4.5 gallons of emulsifier A. About 50.1 gallons were left in the processing tank to serve as the reactant emulsion for the next batch.
2. About 17.1 gallons of CARB diesel fuel were added to the processing tank followed by about 4.4 gallons of emulsifier A.
3. The reactant emulsion, diesel fuel, and emulsifier A were circulated through the IKA high shear mixer for about 30 seconds and back to the processing tank.
4. Following about 30 second mix and while continuing to circulate through the mixer, a total of about 28.4 gallons of water were added through a charging line immediately upstream of the mixer.
5. Once all water was added, the mixture continued to circulate through the IKA mixer for about an additional 16 minutes.
6. Samples of concentrated emulsion were taken from the processing tank at various time intervals during this mix period representing 1, 2, 4, 7 and 10.4 tank turnovers. A tank turnover is defined as the duration to pump 100 gallons through the mixer.
7. The concentrated emulsion was pumped to a diluter tank and diluted with about 229.3 gallons of CARB diesel fuel.
8. The diluter tank was circulated with a centrifugal pump for about 9 minutes.
9. A sample of the final aqueous hydrocarbon fuel emulsion was taken from the diluter tank.
10. The results are found in Table I.

TABLE I

| Sample description | Particle Size Distribution Mean μm | Mode μm | 7 day static storage (room temperature) | % Oily | % White | % | % Oil | % Oily | % White | % |
|---|---|---|---|---|---|---|---|---|---|---|
| | | | | | | | 7 day static storage (43° C.) | | | |
| Example 1: 1:24 mn:sec | 0.78 | 0.47 | 6 | 94 | 3 | | 9 | | 91 | 7 |
| Example 1: 2:48 mn:sec | 0.77 | 0.47 | 6 | 94 | 4 | | 9 | | 91 | 7 |
| Example 1: 5:36 mn:sec | 0.77 | 0.52 | 4 | 96 | 4 | | 9 | | 91 | 7 |
| Example 1: 9:48 mn:sec | 0.79 | 0.52 | 4 | 96 | 4 | | 9 | | 91 | 7 |
| Example 1: 12:36 mn:sec | 0.78 | 0.52 | 6 | 94 | 4 | | 9 | | 91 | 7 |
| Example 2: 1:24 mn:sec | 0.63 | 0.43 | 6 | 94 | 4 | | 6 | | 94 | 6 |
| Example 2: 2:48 mn:sec | 0.64 | 0.43 | 6 | 94 | 4 | | 7 | | 93 | 6 |
| Example 2: 5:36 mn:sec | 0.68 | 0.47 | 4 | 96 | 4 | | 7 | | 93 | 6 |
| Example 2: 9:48 mn:sec | 0.63 | 0.47 | 6 | 94 | 3 | | 7 | | 93 | 6 |
| Example 2: 12:36 mn:sec | 0.63 | 0.47 | 4 | 96 | 3 | | 7 | | 93 | 6 |
| Example 3: 1:32 mn:sec | 1.31 | 1.45 | | | | | | | | |
| Example 3: 3:04 mn:sec | 1.40 | 1.59 | | | | | | | | |
| Example 3: 6:06 mn:sec | 1.30 | 0.91 | | | | | | | | |
| Example 3: 10:44 mn:sec | 1.05 | 1.20 | | | | | | | | |
| Example 3: 16:00 mn:sec | 0.92 | 1.24 | | | | | | | | |
| Example 3: final sample | 0.89 | 0.63 | 3 | 97 | 7 | | 3 | 6 | 91 | 12 |
| Example 4: 1:32 mn:sec | 1.12 | 1.32 | | | | | | | | |
| Example 4: 3:04 mn:sec | 1.05 | 1.00 | | | | | | | | |
| Example 4: 6:06 mn:sec | 0.98 | 1.00 | | | | | | | | |
| Example 4: 10:44 mn:sec | 0.90 | 0.83 | | | | | | | | |
| Example 4: 16:00 mn:sec | 0.83 | 0.76 | | | | | | | | |
| Example 4: final sample | 0.86 | 0.83 | 3 | 97 | 7 | | 4 | 4 | 91 | 10 |

The continuous process described herein depicts another embodiment of the invention. The feeds of the hydrocarbon fuel, emulsifier, reactant emulsion and water are introduced as discreet feeds or in the alternative combinations of the discreet feeds, to form a homogeneous hydrocarbon fuel emulsion. It is preferable that the processing streams of the fuel, emulsifier, water and emulsion reactant, are introduced as close to the inlet of the emulsification device as possible. It is preferable that the emulsifier is added to the fuel as a hydrocarbon fuel emulsifier stream prior to the discreet feeds combining together.

The ratio of the hydrocarbon fuel, emulsifier and water to reactant emulsion in one embodiment is about 1% hydrocarbon fuel, emulsifier and water to about 99% reactant emulsion, in another embodiment about 99% hydrocarbon fuel, emulsifier and water to about 1% reactant emulsion, in another embodiment about 15% hydrocarbon fuel, emulsifier and water to about 85% reactant emulsion, in another embodiment about 40% hydrocarbon fuel, emulsifier and water to about 60% reactant emulsion, in another embodiment about 60% hydrocarbon fuel, emulsifier and water to about 40% reactant emulsion, and in another embodiment 50% hydrocarbon fuel, emulsifier and water to about 50% reactant emulsion. The hydrocarbon fuel emulsifier stream during startup and shutdown is such that the ratio of water to hydrocarbon fuel emulsion mixture is never greater than the steady state condition.

The continuous process generally occurs under ambient conditions. The continuous process is generally done at atmospheric pressure to about 500 psi, in another embodiment in the range of about atmospheric pressure to about 120 psi, and in another embodiment in the range of about atmospheric pressure to about 50 psi. The continuous process generally occurs at ambient temperature. In one embodiment the temperature is in the range of about ambient temperature to about 212° F., and in another embodiment in the range of about 40° F. to about 150° F.

The emulsification provides for the desired particle size and a uniform dispersion of water in the fuel and occurs at a shear rate in the range of greater than $0$ $s^{-1}$ to about $500,000$ $s^{-}$, preferably about $20,000$ $s^{-1}$ to about $200,000$ $s^{-1}$, more preferably of about $25,000$ $s^{-1}$ to about $125,000$ $s^{-1}$ of shearing. If more than one emulsification step is used, the shear rates of the emulsification steps can be the same, similar or different, depending on the emulsifier used and the ratio of reactant emulsion to fuel additive and/or water.

In another embodiment the emulsion flows through at least one to several emulsification devices. In another embodiment, the emulsion flows through the next one to five emulsification devices. The emulsion flows through the emulsion devices in series, directly from one emulsification device to the next emulsification device in the series.

In one embodiment there is no intermediate holding tank between the emulsification steps. The emulsion is not aged between the emulsification steps. Generally the time the emulsion flows from one emulsification device to another emulsification device in less than 5 minutes, in another embodiment less than 4 minutes, in another embodiment less than 3 minutes, in another embodiment less than 2 minutes, in another embodiment less than 1 minute, and in another embodiment less than 30 seconds.

The other emulsification steps, in series, are a high-shear process and occur under ambient conditions as described in the emulsification step above. The shear rate temperature and pressure can be the same, similar or different than the other emulsification steps so long as the conditions are such to provide the desired mean droplet particle size.

The emulsification step is a high shear process and results in a uniform dispersion of the hydrocarbon fuel emulsion having a mean particle droplet size in the range of about 0.1 micron to about 1 micron, in one embodiment in the range of about 0.1 micron to about 0.95 micron, in one embodiment in the range of about 0.1 micron to about 0.8 micron, and in one embodiment in the range of about 0.1 micron to about 0.7 micron, and in one embodiment in the range of about 0.2 micron to about 0.5 micron. A critical feature of the invention is that the water phase of the aqueous fuel emulsion product is comprised of water droplets having a mean diameter of less than one micron, in another embodiment one micron to about 0.1 micron, and in another embodiment 1.0 micron to about 0.2 micron.

The emulsification occurs by any method known in the industry including but not limited to mixing, mechanical mixer agitation, static mixers, shear mixers, sonic mixers, high-pressure homogenizers, and the like. Examples of the emulsification devices include but are not limited to an Aquashear, pipeline static mixers and the like. The Aquashear is a low-pressure hydraulic shear device. The material is forced through two facing plates with drilled holes into the mixing chamber. The two plates cause counter rotational flow and allow the material to mix. The Aquashear mixers are available from Flow Process Technologies Inc.

Additional emulsification devices include high-shear devices such as IKA Works, Inc. Dispax Reactor. The IKA shear mixers use a DR3-6 with three stages of rotor/stator combinations. The tip speed of the rotor/stator generators may be varied by a variable frequency drive that controls the motor. The Silverson mixer is a two-stage mixer, which incorporates a rotor/stator design. The mixer has high-volume pumping characteristics similar to centrifugal pump. Inline shear mixers by Silverson Corporation (a rotor-stator emulsification approach); Jet Mixers (venturi-style/ cavitation shear mixers), Ultrasonolator made by the Sonic Corp. (ultrasonic emulsification approach), Microfluidizer shear mixers available by Microfluidics Inc. (high-pressure homogenization shear mixers), ultrasonic mixers, and any other available high-shear mixer.

These emulsification devices have to have the ability to reduce the mean particles size of the water droplet in the range of less than one micron to about 0.1 micron or even less.

The hydrocarbon fuel, at least one emulsifier and water are emulsified to form a reactant emulsion. The reactant emulsion is formed from recycling the aqueous hydrocarbon fuel emulsion or separately by emulsifying the hydrocarbon fuel with at least one emulsifier in a separate vessel. The water may optionally contain water-soluble additives. The reactant emulsion is generally recycled in the process. The reactant emulsion may contain the same, similar or different hydrocarbon fuel and/or emulsifier than the aqueous hydrocarbon fuel. The reactant emulsion may be the same, similar or different composition as the desired aqueous hydrocarbon fuel emulsion. By using a reactant emulsion as an initial component, the overall particle size decreases and the aqueous hydrocarbon fuel emulsion stability is increased.

The hydrocarbon fuel and emulsifier contains about 50% to about 99% by weight, preferably about 85% to about 98% by weight, and more preferably about 95% to about 98% by weight hydrocarbon fuel, and it further contains about 0.05% to about 25%, preferably about 1% to about 15%, and more preferably about 1% to about 5% by weight of at least one emulsifier.

Optionally, additives may be added to the reactant emulsion, hydrocarbon fuel, emulsifier, water or combinations thereof. The additives include but are not limited to cetane improvers, organic solvents, antifreeze agents, surfactants, other additives known for their use in fuel and the like. The additives are added to the reaction emulsion, hydrocarbon fuel, emulsifier or the water, prior to and in the alternative at the first emulsification step dependent upon the solubility of the additive. The additives are generally in the range of about 1% to about 40% by weight, preferably about 5% to about 30% by weight, and more preferably about 7% to about 25% by weight of the additive emulsifier.

The water can optionally include but is not limited to the water-soluble additives such as antifreeze, ammonium nitrate, ammonium salts or mixtures thereof. Ammonium nitrate is generally added to the water mixture as an aqueous solution. In one embodiment the water, the antifreeze and/or the ammonium nitrate are mixed dynamically and fed continuously to the process. In another embodiment the water, antifreeze, ammonium nitrate or mixtures thereof flow out of separate tanks and/or combinations thereof into or mixed prior to the first emulsification step. In one embodiment the water, water alcohol, water-ammonium nitrate, or water-alcohol ammonium nitrate mixture meets the hydrocarbon fuel additives mixture immediately prior to or in the emulsification step.

A programmable logic controller (plc) is optionally employed for governing the continuous flow of the components, thereby controlling the flow rates and mixing ratio in accordance with the prescribed blending rates. The plc stores component percentages input by the operator. The plc then uses these percentages to define volumes/flow of each component required. Continuous flow sequence is programmed into the plc. The plc electronically monitors all level switches, valve positions and fluid meters.

EXAMPLE 5

This example is illustrative of making a hydrocarbon fuel emulsion product by a continuous process. A mixture having the following components was prepared.

|  | Concentrate | Emulsion |
| --- | --- | --- |
| Diesel | — | 78.12 |
| Water | — | 20.00 |
| Emulsifier 1 | 40.00 | 0.5 |
| Emulsifier 2 | 7.14 | 0.214 |
| Emulsifier 3 | 19.80 | 0.297 |
| 2-ethylhexylnitrate | 23.80 | 0.714 |
| Ammonium Nitrate (54% by weight in water | 9.26 | 0.15 |

Emulsifier 1: Reaction product of dimethylethanolamine and PIBSA (Mn-2000)
Emulsifier 2: Reaction product of dimethylethanolamine and hexadecylsuccinnic anhydride
Emulsifier 3: Reaction product of an ethylene polyamine and PIBSA (Mn-1000)

Figure 1:
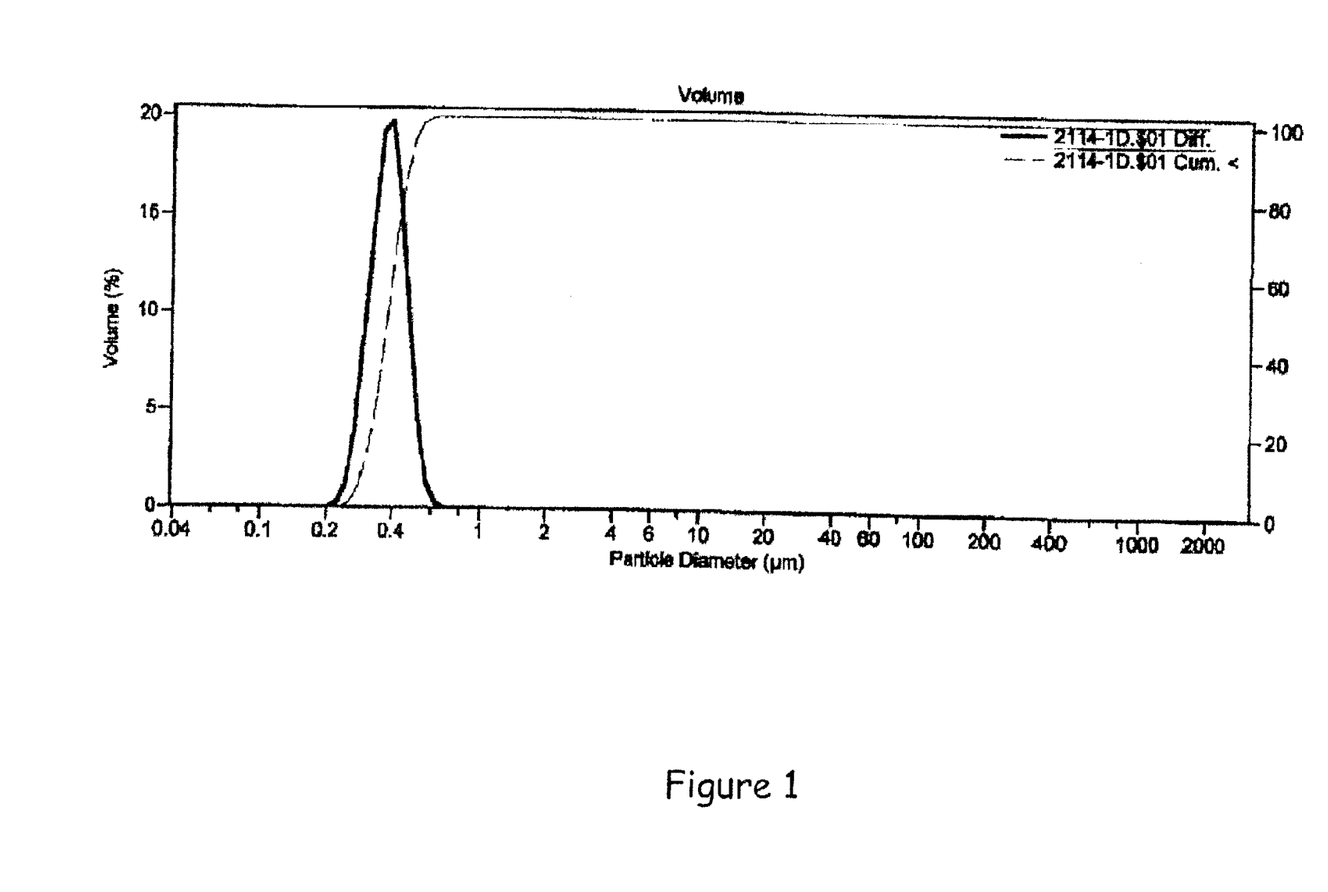

About 2.88% weight of an emulsifier reactant is added to about 97.12% weight of diesel fuel and mixed to produce a hydrocarbon fuel emulsifier mixture. The hydrocarbon fuel and emulsifier, at a flow rate of 4.95 gallons per minute (F1), was emulsified with water that had a flow rate of about 1.05 gallons per minute (F2) at room temperature along with the emulsion reactant that had a flow rate of about 6.0 gallons per minute (F4). The processing streams were introduced close to the entry portal of the shear mixer as possible. The shear mixer was a 12 GPM IKA Works Dispax mixer with three superfine mixing elements operating at about 9600 rpm (revolutions per minute). The output from this mixer (F3) was then split into two streams where about 6.0 gallons per minute was diverted through a conduit to the inlet of the IKA Works Dispax mixer (F4) and about 6.0 gallons per minute was pumped through a conduit to storage (F5). This process has been shown to produce a water in oil emulsion with the following particle size distribution (see FIG. 1).

Figure 2:
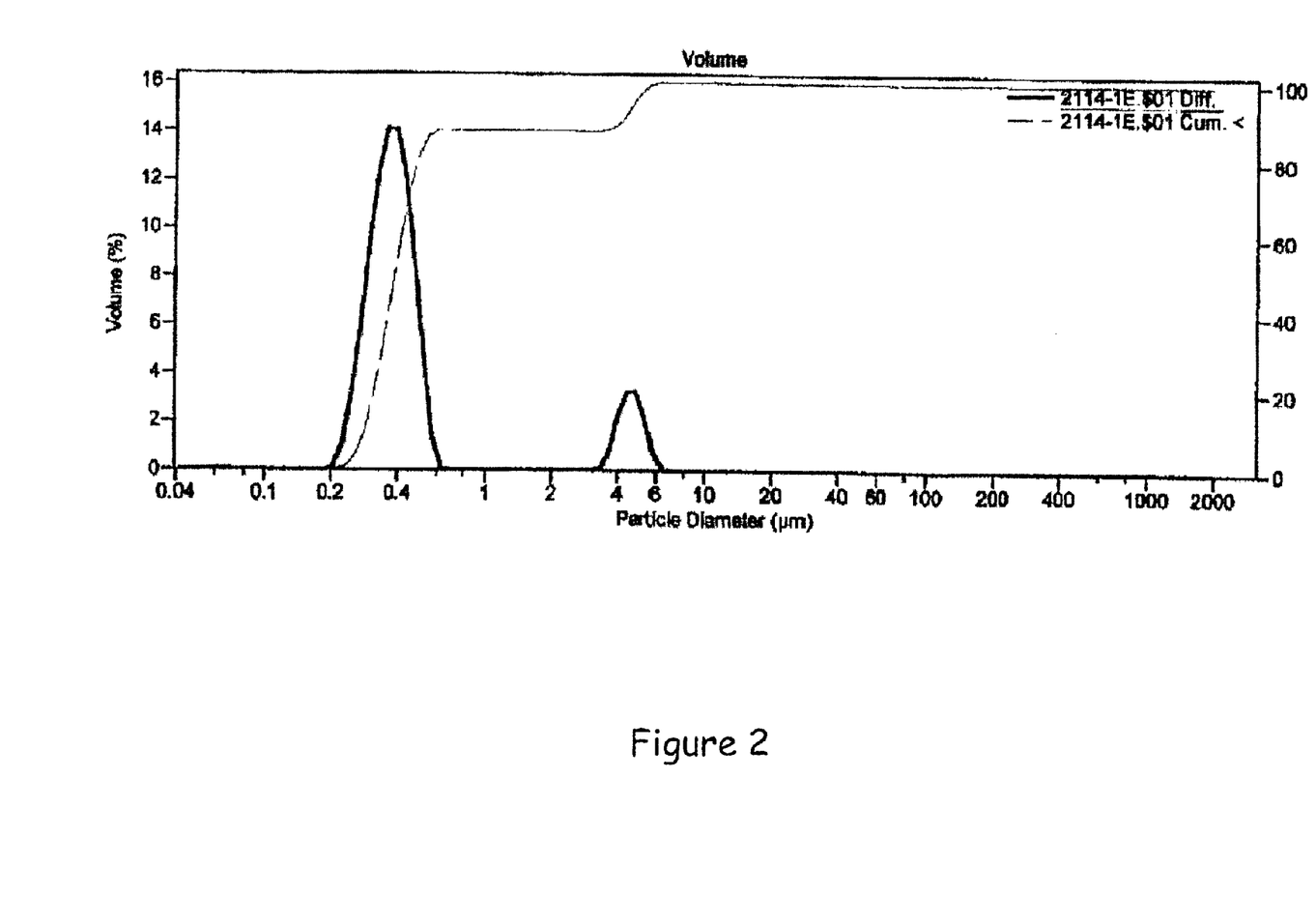

The particle size of the resulting emulsion made by the continuous process with an identical formulation made via a process without the emulsion co-feed (i.e. F4=0 gallons per minute) is shown in FIG. 2.

The example showed that a continuous process using an emulsion co-feed unexpectedly consistently produced higher quality results.

The aqueous hydrocarbon fuel emulsion product produced by the continuous process involves less processing time than by batch processing. Thus, the inventive process to make the same water-blended fuel product is an improvement over other processes because of the increased throughput and efficiency.

The Hydrocarbon Fuel

The liquid hydrocarbon fuel comprises hydrocarbonaceous petroleum distillate fuel, non-hydrocarbonaceous materials that include but are not limited to water, oils, liquid fuels derived from vegetables, liquid fuels derived from minerals and mixtures thereof. The liquid hydrocarbon fuel may be any and all hydrocarbonaceous petroleum distillate fuels including not limited to motor gasoline as defined by ASTM Specification D439 or diesel fuel or fuel oil as defined by ASTM Specification D396 or the like (kerosene, naphtha, aliphatics and paraffinics). The liquid hydrocarbon fuels comprising non-hydrocarbonaceous materials include but are not limited to alcohols such as methanol, ethanol and the like, ethers such as diethyl ether, methyl ethyl ether and the like, organo-nitro compounds and the like; liquid fuels derived from vegetable or mineral sources such as corn, alfalfa, shale, coal and the like. The liquid hydrocarbon fuels also include mixtures of one or more hydrocarbonaceous fuels and one or more non-hydrocarbonaceous materials. Examples of such mixtures are combinations of gasoline and ethanol and of diesel fuel and ether. In one embodiment, the liquid hydrocarbon fuel is any gasoline. Generally, gasoline is a mixture of hydrocarbons having an ASTM distillation range from about 60° C. at the 10% distillation point to about 205° C. at the 90% distillation point. In one embodiment, the gasoline is a chlorine-free or low-chlorine gasoline characterized by a chlorine content of no more than about 10 ppm.

In one embodiment, the liquid hydrocarbon fuel is any diesel fuel. Diesel fuels typically have a 90% point distillation temperature in the range of about 300° C. to about 390° C., and in one embodiment about 330° C. to about 350° C. The viscosity for these fuels typically ranges from about 1.3 to about 24 centistokes at 40° C. The diesel fuels can be classified as any of Grade Nos. 1-D, 2-D or 4-D as specified in ASTM D975. The diesel fuels may contain alcohols and esters. In one embodiment the diesel fuel has a sulfur content of up to about 0.05% by weight (low-sulfur diesel fuel) as determined by the test method specified in ASTM D2622-87. In one embodiment, the diesel fuel is a chlorine-free or low-chlorine diesel fuel characterized by chlorine content of no more than about 10 ppm.

The liquid hydrocarbon fuel is present in the aqueous hydrocarbon fuel emulsion at a concentration of about 50% to about 95% by weight, and in one embodiment about 60% to about 95% by weight, and in one embodiment about 65% to about 85% by weight, and in one embodiment about 80% to about 90% by weight of the aqueous hydrocarbon fuel emulsion.

The Water

The water used in the aqueous hydrocarbon fuel emulsion may be taken from any source. The water includes but is not limited to tap, deionized, demineralized, purified, for example, using reverse osmosis or distillation, and the like. The water includes water mixtures that further includes antifreeze such as alcohols and glycols, ammonium salts such as ammonium nitrate, ammonium maleate, ammonium acetate and the like, and combinations thereof.

The water may be present in the aqueous hydrocarbon fuel emulsions at a concentration of about 1% to about 50% by weight, and in one embodiment about 5% to about 50% by weight, and in one embodiment about 5% to about 40% being weight, and in one embodiment about 5% to about 25% by weight, and in one embodiment about 10% to about 20% water.

The Reactant Emulsion Component

The reactant emulsion is at least one of the ingredients in the process and not necessarily a reactant in a chemical reaction. The reactant emulsion comprises the hydrocarbon fuel, water and at least one emulsifier. The reactant emulsion may be prepared by the steps of (1) mixing the fuel and an emulsifying amount of at least one emulsifier using standard mixing techniques to form the initial emulsion component or, in the alternative, under emulsification mixing conditions to form the reactant emulsion. The reactant emulsion can be prepared from any emulsion process including the process of this invention. It is in effect a recycling of a finished emulsified fuel into the process for making more emulsifier fuels.

The initial emulsion component contains about 50% to about 99% by weight, in another embodiment about 85% to about 98% by weight, and in another embodiment about 95% to about 98% by weight hydrocarbon fuel, and it further contains about 0.05% to about 25%, in another embodiment about 1% to about 15%, and in another embodiment about 1% to about 5% by weight of the emulsifier.

The reactant emulsifier can have the same, similar or a different emulsifier and the same, similar or different fuel then is used to form the aqueous hydrocarbon fuel emulsion. The emulsifier includes but is not limited to:

(i) at least one fuel-soluble product made by reacting at least one hydrocarbyl-substituted carboxylic acid acylating agent with ammonia or an amine including but not limited to alkanol amine, hydroxy amine, and the like, the hydrocarbyl substituent of said acylating agent having about 50 to about 500 carbon atoms;

(ii) at least one of an ionic or a nonionic compound having a hydrophilic-lipophilic balance (HLB) of about 1 to about 40;

(iii) mixture of (ii) with (i);

(iv) a water-soluble compound selected from the group consisting of amine salts, ammonium salts, azide compounds, nitrate esters, nitramine, nitrocompounds, alkali metal salts, alkaline earth metal salts, in combination with (i), (ii), (iii), (v), (vii) or combinations thereof;

(v) the reaction product of polyacidic polymer with at least one fuel soluble product made by reacting at least one hydrocarbyl-substituted carboxylic acid acylating agent with ammonia, an amine, a polyamine, an alkanol amine or hydroxy amines;

(vi) an amino alkylphenol which is made by reacting an alkylphenol, an aldehyde and an amine resulting in an amino alkylphenol, or (vii) the combination of (vi) with (i), (ii), (iii), (iv), (v) or combinations thereof.

The Emulsifier
Fuel Soluble Product (i)

The fuel-soluble product (i) may be at least one fuel-soluble product made by reacting at least one hydrocarbyl-substituted carboxylic acid acylating agent with ammonia or an amine including but not limited to alkanol amines, hydroxy amines, and the like, the hydrocarbyl substituent of said acylating agent having about 50 to about 500 carbon atoms, and is described in greater detail in U.S. Ser. No. 09/761,482, An Emulsifier For An Aqueous Hydrocarbon Fuel, incorporated by reference herein.

The hydrocarbyl-substituted carboxylic acid acylating agents may be carboxylic acids or reactive equivalents of such acids. The reactive equivalents may be acid halides, anhydrides, or esters, including partial esters and the like. The hydrocarbyl substituents for these carboxylic acid acylating agents may contain from about 50 to about 500 carbon atoms, and in one embodiment about 50 to about 300 carbon atoms, and in one embodiment about 60 to about 200 carbon atoms. In one embodiment, the hydrocarbyl substituents of these acylating agents have number average molecular weights of about 700 to about 3000, and in one embodiment about 900 to about 2300.

The hydrocarbyl-substituted carboxylic acid acylating agents may be made by reacting one or more alpha-beta olefinically unsaturated carboxylic acid reagents containing 2 to about 20 carbon atoms, exclusive of the carboxyl groups, with one or more olefin polymers as described more fully hereinafter.

In one embodiment, the hydrocarbyl-substituted carboxylic acid acylating agent is a polyisobutene-substituted succinic anhydride, the polyisobutene substituent having a number average molecular weight of about 1,500 to about 3,000, in one embodiment about 1,800 to about 2,300, in one embodiment about 700 to about 1300, in one embodiment about 800 to about 1000, said first polyisobutene-substituted succinic anhydride being characterized by about 1.3 to about 2.5, and in one embodiment about 1.7 to about 2.1 In one embodiment, the hydrocarbyl-substituted carboxylic acid acylating agent is a polyisobutene-substituted succinic anhydride, the polyisobutene substituent having a number average molecular weight of about 1,500 to about 3,000, and in one embodiment about 1,800 to about 2,300, said first polyisobutene-substituted succinic anhydride being characterized by about 1.3 to about 2.5, and in one embodiment about 1.7 to about 2.1, in one embodiment about 1.0 to about 1.3, and in one embodiment about 1.0 to about 1.2 succinic groups per equivalent weight of the polyisobutene substituent.

The fuel-soluble product (i) may be formed using ammonia, an amine and/or metals such as Na, K, Ca, and the like. The amines useful for reacting with the acylating agent to form the product (i) including but are not limited to, monoamines, polyamines, alkanol amines, hydroxy amines, and mixtures thereof, and amines may be primary, secondary or tertiary amines.

Examples of primary and secondary monoamines include ethylamine, diethylamine, n-butylamine, di-n-butylamine, allylamine, isobutylamine, cocoamine, stearylamine, laurylamine, methyllaurylamine, oleylamine, N-methyloctylamine, dodecylamine, and octadecylamine. Suitable examples of tertiary monoamines include trimethylamine, triethylamine, tripropylamine, tributylamine, monoethyldimethylamine, dimethylpropylamine, dimethylbutylamine, dimethylpentylamine, dimethylhexylamine, dimethylheptylamine, and dimethyloctylamine.

The amines include but are not limited to hydroxyamines, such as mono-, di-, and triethanolamine, dimethylethanol amine, diethylethanol amine, di-(3-hydroxy propyl) amine, N-(3-hydroxybutyl) amine, N-(4-hydroxy butyl) amine, and N,N-di-(2-hydroxypropyl) amine; alkylene polyamines such as methylene polyamines, ethylene polyamines, butylene polyamines, propylene polyamines, pentylene polyamines, and the like. Specific examples of such polyamines include ethylene diamine, diethylene triamine, triethylene tetramine, propylene diamine, trimethylene diamine, tripropylene tetramine, tetraethylene pentamine, hexaethylene heptamine, pentaethylene hexamine, or a mixture of two or more thereof; ethylene polyamine; is a polyamine bottoms or a heavy polyamine. The fuel-soluble product (i) may be a salt, an ester, an ester/salt, an amide, an imide, or a combination of two or more thereof.

The fuel-soluble product (i) may be present in the water-fuel emulsion at a concentration of up to about 15% by weight based on the overall weight of the emulsion, and in one embodiment about 0.1 to about 15% by weight, and an one embodiment about 0.1 to about 10% by weight, and in one embodiment about 0.1 to about 5% by weight, and in one embodiment about 0.1 to about 2% by weight, and in one embodiment about 0.1 to about 1% by weight, and in one embodiment about 0.1 to about 0.7% by weight.

The Ionic or Nonionic Compound (ii)

The ionic or nonionic compound (ii) has a hydrophilic-lipophilic balance (HLB, which refers to the size and strength of the polar (hydrophilic) and non-polar (lipophilic) groups on the surfactant molecule) in the range of about 1 to about 40, and in one embodiment about 4 to about 15 and is described in greater detail in U.S. Ser. No. 09/761,482, An Emulsifier For An Aqueous Hydrocarbon Fuel, incorporated by reference herein. Examples of these compounds are disclosed in *McCutcheon's Emulsifiers and Detergents,* 1998, North American & International Edition. Pages 1–235 of the North American Edition and pages 1–199 of the International Edition are incorporated herein by reference for their disclosure of such ionic and nonionic compounds having an HLB in the range of about 1 to about 40, in one embodiment about 1 to about 30, in one embodiment about 1 to 20, and in another embodiment about 1 to about 10. Examples include low molecular weight variants of (i) or (vii) such as those having a hydrocarbon group in the range of $C_8$ or $C_{20}$. Useful compounds include alkanolamides, carboxylates including amine salts, metallic salts and the like, alkylarylsulfonates, amine oxides, poly(oxyalkylene) compounds, including block copolymers comprising alkylene oxide repeat units, carboxylated alcohol ethoxylates, ethoxylated alcohols, ethoxylated alkylphenols, ethoxylated amines and amides, ethoxylated fatty acids, ethoxylated fatty esters and oils, fatty esters, fatty acid amides, including but not limited to amides from tall oil fatty acids and polyamides, glycerol esters, glycol esters, sorbitan esters, imidazoline derivatives, lecithin and derivatives, lignin and derivatives, monoglycerides and derivatives, olefin sulfonates, phosphate esters and derivatives, propoxylated and ethoxylated fatty acids or alcohols or alkylphenols, sorbitan derivatives, sucrose esters and derivatives, sulfates or alcohols or ethoxylated alcohols or fatty esters, sulfonates of dodecyl and tridecyl benzenes or condensed naphthalenes or petroleum, sulfosuccinates and derivatives, and tridecyl and dodecyl benzene sulfonic acids. In the preferred embodiment of an amine salt, it is a $C_8$-$C_{20}$ alkenyl succinic ester amine salts such as the reaction product of an alkenyl succinic anhydride with alkanol amine such as N,N-dimethylethanol amine, N,N-diethylethanol amine or the like.

Emulsifier Mixture (iii)

A mixture of (i) and (ii) is described in greater detail in U.S. Ser. No. 09/761,482, An Emulsifier For An Aqueous Hydrocarbon Fuel, incorporated by reference herein.

The Water-Soluble Compound (in iv)

The water-soluble compound may be an amine salt, ammonium salt, azide compound, nitro compound, alkali metal salt, alkaline earth metal salt, or mixtures of two or more thereof and is described in greater detail in U.S. Ser. No. 09/761,482, An Emulsifier For An Aqueous Hydrocarbon Fuel, incorporated by reference herein. These compounds are distinct from the fuel-soluble product (i) and the ionic or nonionic compound (ii) discussed above. These water-soluble compounds include organic amine nitrates, nitrate esters, azides, nitramines and nitro compounds. Also included are alkali and alkaline earth metal carbonates, sulfates, sulfides, sulfonates, and the like.

Particularly useful are the amine or ammonium salts such as ammonium nitrate, ammonium acetate, methylammonium nitrate, methylammonium acetate, ethylene diamine diacetate; urea nitrate; urea; guanidinium nitrate; and combinations thereof.

The water-soluble compound may be present in the water-fuel emulsion at a concentration of about 0.001 to about 1% by weight, and in one embodiment from about 0.01 to about 1% by weight.

Emulsifier (v)

In one embodiment the emulsifier (v) is the reaction product of A) a polyacidic polymer, B) at least one fuel soluble product made by reacting at least one hydrocarbyl-substituted carboxylic acid acylating agent, and C) a hydroxy amine and/or a polyamine and is described in greater detail in U.S. Ser. No. 09/761,482, An Emulsifier For An Aqueous Hydrocarbon Fuel, incorporated by reference herein.

The fuel soluble product is made by reacting at least one hydrocarbyl-substituted carboxylic agent with a hydroxy amine and/or polyarnine and is described earlier in the specification.

The polyacidic polymers used in the reaction include but are not limited to $C_4$ to $C_{30}$, preferably $C_8$ to $C_{20}$ olefin/maleic anhydride copolymers. The alpha-olefins include 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, 1-heptadecene, 1-octadecene, 1-eicosene, 1-docosene, 1-triacontene, and the like. the alpha olefin fractions that are useful include $C_{15-18}$ alpha-olefins, $C_{12-16}$ alpha-olefins, $C_{14-16}$ alpha-olefins, $C_{14-18}$ alpha-olefins, $C_{16-18}$ alpha-olefins, $C_{18-24}$ alpha-olefins, $C_{18-30}$ alpha-olefins, and the like. Mixtures of two or more of any of the foregoing alpha-olefins or alpha-olefin fractions may be used.

Other polyacidic polymers suitable for reaction include but are not limited to maleic anhydride/styrene copolymers; poly-maleic anhydride; acrylic and methacrylic acid containing polymers; poly-(alkyl)acrylates; reaction products of maleic anhydride with polymers with multiple double bonds; and combinations thereof. The preferred is polyacidic polymer $C_{18}$ [1-octadecene]/maleic anhydride copolymer.

In another embodiment the polyacidic polymer is a copolymer of an olefin and a monomer having the structure:

(I)

wherein X and X1 are the same or different provided that at least one of X and $X_1$ is such that the copolymer can function as a carboxylic acylating agent.

The olefin includes a polymerizable olefin characterized by the presence of one or more ethylenically unsaturated groups. The olefin monomers include but are not limited to 1-hexene, octadecene-1 and diisobutylene. The olefin preferably is a $C_4$–$C_{30}$ olefin.

The emulsifier produced from the reaction product of the polyacidic polymer with the fuel soluble product (i) comprises about 25% to about 95% of fuel soluble product and about 0.1% to about 50% of the polyacidic polymer; preferably about 50% to about 92% fuel soluble product and about 1% to about 20% of the polyacidic polymer, and most preferably about 70% to about 90% of fuel soluble product and about 5% to about 10% of the polyacidic polymer. In one embodiment the emulsifier is described as a polyalkenyl succinimide crosslinked with an olefin/maleic anhydride copolymer.

Amino Alkylphenol Emulsifier (vi) and (vii)

The amino alkyl emulsifier is comprised of the reaction product of an amino alkylphenol, an aldehyde, and an amine resulting in amino alkylphenol. The amino alkylphenol can be made by (a) the reaction of alkylphenol directly with an aldehyde and an amine resulting in an alkylphenol monomer connected by a methylene group to an amine, (b) the reaction of an alkylphenol with an aldehyde resulting in an oligomer wherein the alkylphenols are bridged with methylene groups, the oligomer is then reacted with more aldehyde and an amine to give a Mannich product, or (c) a mixture of (a) and (b)

The alkylphenols have an alkyl group selected from $C_1$ to $C_{200}$, preferably $C_6$ to $C_{170}$ wherein the alkyl group is either linear, branched or a combination thereof. The alkylphenols include, but are not limited to, polypropylphenol, polybutylphenol, poly(isobutenyl)phenol, polyamylphenol, tetrapropylphenol, similarly substituted phenols and the like. The preferred alkylphenols are tetrapropenylphenol and poly(isobutenyl)phenol. For example, in place of the phenol, alkyl-substituted compounds of resorcinol, hydroquinone, catechol, cresol, xylenol, amyl phenol, hydroxydiphenyl, benzylphenol, phenylethylphenol, methylhydroxydiphenyl, alpha and beta naphthol, alpha and beta methylnaphthol, tolylinaphthol, xylylnaphthol, benzylnaphthol, anthranol, phenylmethylnaphtol, phenanthrol, monomethyl ether of catechol, phenoxyphenol, chlorophenol, hydroxyphenyl sulfides and the like may be used.

The aldehydes include, but are not limited to, aliphatic aldehydes, such as formaldehyde; acetaldehyde; aldol (β-hydroxy butyraldehyde); aromatic aldehydes, such as benzaldehyde; heterocyclic aldehydes, such as furfural, and the like. The aldehyde may contain a substituent group such as hydroxyl, halogen, nitro and the like; in which the substituent does not take a major part in the reaction. The preferred aldehyde is formaldehyde.

The amines are those which contain an amino group characterized by the presence of at least one active hydrogen atom. The amines may be primary amino groups, secondary amino groups, or combinations of primary and secondary amino groups.

The amines include, but are not limited to, alkanolamines such as monoethanol amine, diethanolamine, N-(2-aminoethyl) ethanolamine and the like; di- and polyamine (polyalkyene amines) such as dimethylaminopropylamine, 3-aminopropyl morpholine, ethylendiamine, diethylenetriamine, triethylene tetramine, tetraethylene pentamine and the like including distillation bottoms such as HPAX (commercially available from The Union Carbide Corporation), E-100 (commercially available from Dow Chemical Co.), and the like; polyalkyl polyamines; propylenediamine, the aromatic amines such as o-, m- and p-phenylene diamine, diamino naphthalenes; the acid-substituted polyalkylpolyamines, such as N-acetyl tetraethylenepentamine, and the corresponding formyl-, propionyl-, butyryl-, and the like N-substituted compounds; and the corresponding cyclized compounds formed therefrom, such as the N-alkyl amines of imidazolidine and pyrimidine. (Secondary heterocyclic amines that are suitable are those characterized by attachment of a hydrogen atom to a nitrogen atom in the heterocyclic group such as morpholine, thiomorpholine, pyrrole, pyrroline, pyrrolidine, indole, pyrazole, pyrazoline, pyrazolidine, imidazole, imidazoline, imidazolidine, piperidine, phenoxazine, phenthiazine and their substituted analogs. Substituent groups attached to the carbon atoms of these amines are typified by alkyl, aryl, alkaryl, aralkyl, cycloalkyl, and amino compounds referred to above.)

The "amine" includes, but is not limited, to the product obtained by reacting an alkenyl succinic anhydride such as succinic anhydride of the formula or alkenyl succinic acid such as succinic acids of the formula with the amines of the foregoing paragraph.

In the above formulae, R is an alkylene group. The alkenyl radical can be straight-chain or branched-chain; and it can be saturated at the point of unsaturation by the addition of a substance that adds to olefinic double bonds, such as hydrogen, sulfur, bromine, chlorine, or iodine. There must be at least two carbon atoms in the alkenyl radical, but there is no real upper limit to the number of carbon atoms therein. The alkenyl succinic acid anhydrides and the alkenyl succinic acids are interchangeable for the purposes of the present invention. Nonlimiting examples of the alkenyl succinic acid anhydride component are ethenyl succinic acid anhydride; ethenyl succinic acid; ethyl succinic acid anhydride; propenyl succinic acid anhydride; sulfurized propenyl succinic acid anhydride; butenyl succinic acid; 2-methylbutenyl succinic acid anhydride; 1,2-dichloropentyl succinic acid anhydride; hexenyl succinic acid anhydride; hexyl succinic acid; sulfurized 3-methylpentyl succinic acid anhydride; 2,3-dimethylbutenyl succinic acid anhydride; 3,3-dimethylbutenyl succinic acid; 1,2-dibromo-2-ethylbutyl succinic acid; heptenyl succinic acid anhydride; 1,2-diiodooctyl succinic acid; octenyl succinic acid anhydride; diisobutenyl succinic acid anhydride; 2-methylheptenyl succinic acid anhydride; 4-ethylhexenyl succinic acid; 2-isopropylpentenyl succinic acid anhydride; nonenyl succinic acid anhydride; 2-propylhexenyl succinic acid anhydride; decenyl succinic acid; decenyl succinic acid anhydride; 5-methyl-2-isopropyl-hexenyl succinic acid anhydride; 1,2-dibromo-2-ethyloctenyl succinic acid anhydride; decyl succinic acid anhydride; undecenyl succinic acid anhydride; 1,2-dichloroundecyl succinic acid; 3-ethyl-2-t-butylpentenyl succinic acid anhydride; tetrapropenyl succinic acid anhydride; tetrapropenyl succinic acid; tri-isobutenyl succinic acid anhydride, 2-propyl-nonyl succinic acid anhydride, 3-butyloctenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibromo-2-methylpentadecenyl succinic acid anhydride; 8-propylpentadecyl succinic acid anhydride; eicosenyl succinic acid anhydride; 1,2-dichloro-2-methylnonadecenyl succinic acid anhydride; 2-octyldodecenyl succinic acid; 1,2-diiodotetracosenyl succinic acid anhydride; hexacosenyl succinic acid; hexacosenyl succinic acid anhydride; hentriacontenyl succinic acid anhydride and combinations thereof. In general, alkenyl succinic acid anhydrides having from about 8 to about 35, and preferably, from about 9 to about 18 carbon atoms in the alkenyl group. Methods for preparing the alkenyl succinic acid anhydrides are known to those familiar with the art, the most feasible method comprising the reaction of an olefin with maleic acid anhydride.

The reaction is prepared by any known method such as an emulsion, a solution, a suspension, a continuous additive bulk process or the like. The reaction is carried out under conditions that provide for the formation of the desired product. The reaction temperature is in the range of about 40° C. to about 200° C., preferably about 50° C. to about 160° C., and more preferably about 60° C. to about 150° C. The reaction may be carried out at elevated or reduced pressure, but is preferably carried out at atmospheric pressure. The reaction is generally carried out over a period of time in the range of about 15 minutes to about 8 hours, preferably about 1 hour to about 6 hours, and more preferably about 2 hours to about 4 hours.

The amino alkylphenols emulsifier of this invention may be made by reacting the alkylphenol:aldehyde:amine in a ratio range of 1:1:0.1 molar to 1:2:2 molar, in one embodiment preferably 1:0.9:0.1 to 1:1.9:1.9, in one embodiment preferably 1:1.5:1.2 molar to 1:1.9:1.8 molar, and in one embodiment preferably 1:0.8:0.3 to 1:1.5:0.7, resulting in the amino alkylphenol emulsifier.

Ranges for the emulsifier treated in the water blend fuel are in the concentration of about 0.05% to about 20% by weight, and in another embodiment 0.05% to about 10% by weight, and in another embodiment about 0.1% to about 5%, and in another embodiment 0.1% to about 3% by weight of the total emulsion.

In another embodiment of this invention the amino alkylphenol is made by the reaction of an alkylphenol with an aldehyde, resulting in an oligomer wherein the alkylphenols are bridged with methylene groups; then the oligomer is reacted with more aldehyde and amine to give the emulsifier Mannich product of this invention. The reaction is prepared by any known method such as an emulsion, a solution, a suspension, and a continuous addition bulk process. The reaction is carried out under conditions that provide for the formation of the desired product.

The reaction is carried out at a temperature in the range of about 0° C. to about 150° C., preferably about 20° C. to about 100° C., and more preferably about 30° C. to about 70° C. over a period of time in the range of about 15 minutes to about 8 hours, preferably about 1 hour to about 6 hours, and more preferably about 2.5 hours to about 5 hours, resulting in an oligomer wherein the alkylphenols are bridged with methylene groups. This intermediate product is then reacted in the range of about 1 mole oligomer:0.1 mole amine to about 1 mole oligomer:2 moles amine; preferably about 1 mole oligomer:0.2 mole amine to about 1 mole oligomer:1.5 moles amines, and more preferably about 1 mole oligomer:0.3 moles amine to about 1 mole oligomer:0.9 moles amine, resulting in amino alkylphenol product.

This reaction occurs at a temperature of about 40° C. to about 200° C., preferably about 50° C. to about 160° C., and more preferably about 60° C. to about 150° C. The reaction may be carried out at elevated to reduced pressure, but is preferably carried out at atmospheric pressure. The reaction continues until the Mannich product is formed.

This embodiment is illustrated as follows:

The emulsifier may be a mixture of the amino alkylphenol with (i) at least one fuel-soluble product made by reacting at least one hydrocarbyl-substituted carboxylic acid acylating agent with ammonia or an amine, including, but not limited to, alkanol amines, hydroxy amines, and the like, the hydrocarbyl substituent of said acylating agent having about 50 to about 500 carbon atoms;

(ii) at least one of an ionic or a nonionic compound having a hydrophilic-lipophilic balance (HLB) of about 1 to about 40;

(iii) mixture of (ii) with (i);

(iv) a water-soluble compound selected from the group consisting of amine salts, ammonium salts, azide compounds, nitrate esters, nitramine, nitro compounds, alkali metal salts, alkaline earth metal salts, in combination with at least one of (i), (ii), (iii), (v), (vii) or combinations thereof;

(v) the reaction product of polyacidic polymer with at least one fuel soluble product made by reacting at least one hydrocarbyl-substituted carboxylic acid acylating agent with ammonia, an amine, a polyamine, alkanol amines, or hydroxy amines; or (vi) combinations thereof.

The emulsifier may be present in the water fuel emulsion at a concentration of about 0.05% to about 20% by weight, in another embodiment about 0.05% to about 10% by weight, in another embodiment about 0.1% to about 5% by weight, and in a further embodiment of about 0.01% to about 3% by weight of the water fuel emulsion.

Cetane Improver

In one embodiment, the water-fuel emulsion contains a cetane improver. The cetane improvers that are useful include but are not limited to peroxides, nitrates, nitrites, nitrocarbamates, and the like. Useful cetane improvers include but are not limited to nitropropane, dinitropropane, tetranitromethane, 2-nitro-2-methyl-1-butanol, 2-methyl-2-nitro-1-propanol, and the like. Also included are nitrate esters of substituted or unsubstituted aliphatic or cycloaliphatic alcohols which may be monohydric or polyhydric. These include substituted and unsubstituted alkyl or cycloalkyl nitrates having up to about 10 carbon atoms, and in one embodiment about 2 to about 10 carbon atoms. The alkyl group may be either linear or branched, or a mixture of linear or branched alkyl groups. Examples include methyl nitrate, ethyl nitrate, n-propyl nitrate, isopropyl nitrate, allyl nitrate, n-butyl nitrate, isobutyl nitrate, sec-butyl nitrate, tert-butyl nitrate, n-amyl nitrate, isoamyl nitrate, 2-amyl nitrate, 3-amyl nitrate, tert-amyl nitrate, n-hexyl nitrate, n-heptyl nitrate, n-octyl nitrate, 2-ethylhexyl nitrate, sec-octyl nitrate, n-nonyl nitrate, n-decyl nitrate, cyclopentyl nitrate, cyclohexyl nitrate, methylcyclohexyl nitrate, and isopropylcyclohexyl nitrate. Also useful are the nitrate esters of alkoxy-substituted aliphatic alcohols such as 2-ethoxyethyl nitrate, 2-(2-ethoxy-ethoxy) ethyl nitrate, 1-methoxypropyl-2-nitrate, 4-ethoxybutyl nitrate, etc., as well as diol nitrates such as 1,6-hexamethylene dinitrate. A useful cetane improver is 2-ethylhexyl nitrate.

The concentration of the cetane improver in the water-fuel emulsion may be at any concentration sufficient to provide the emulsion with the desired cetane number. In one embodiment, the concentration of the cetane improver is at a level of up to about 10% by weight, and in one embodiment about 0.05 to about 10% by weight, and in one embodiment about 0.05 to about 5% by weight, and in one embodiment about 0.05 to about 1% by weight.

Additional Additives

In addition to the foregoing materials, other fuel additives that are well known to those of skill in the art may be used in the water-fuel emulsions of the invention. These include but are not limited to dyes, rust inhibitors such as alkylated succinic acids and anhydrides, bacteriostatic agents, gum inhibitors, metal deactivators, upper cylinder lubricants, and the like.

The total concentration of chemical additives, including the foregoing emulsifiers, in the water-fuel emulsions of the invention may range from about 0.05 to about 30% by weight, and in one embodiment about 0.1 to about 20% by weight, and in one embodiment about 0.1 to about 15% by weight, and in one embodiment about 0.1 to about 10% by weight, and in one embodiment about 0.1 to about 5% by weight.

Organic Solvent

The additives, including the foregoing emulsifiers, may be diluted with a substantially inert, normally liquid organic solvent such as naphtha, benzene, toluene, xylene or diesel fuel to form an additive concentrate which is then mixed with the fuel and water to form the water-fuel emulsion.

The water-fuel emulsions may contain up to about 60% by weight organic solvent, and in one embodiment about 0.01 to about 50% by weight, and in one embodiment about 0.01 to about 20% by weight, and in one embodiment about 0.1 to about 5% by weight, and in one embodiment about 0.1 to about 3% by weight.

Antifreeze Agent

The water-fuel emulsions of the invention may additionally contain an antifreeze agent. The antifreeze agent is typically an alcohol. Examples include but are not limited to ethylene glycol, propylene glycol, methanol, ethanol, glycerol and mixtures of two or more thereof. The antifreeze agent is typically used at a concentration sufficient to prevent freezing of the water used in the water-fuel emulsions. The concentration is therefore dependent upon the temperature at which the fuel is stored or used. In one embodiment, the concentration is at a level of up to about 20% by weight based on the weight of the water-fuel emulsion, and in one embodiment about 0.1 to about 20% by weight, and in one embodiment about 1 to about 10% by weight.

The Engines

The engines that may be operated in accordance with the invention include all compression-ignition (internal combustion) engines for both mobile (including locomotive and marine) and stationary power plants. These include engines that use diesel, gasoline, and the like. The engines that can be used include but are not limited to those used in automobiles, trucks such as all classes of truck, buses such as urban buses, locomotives, light and heavy duty diesel engines, stationary engines and the like. Included are on- and off-highway engines, including new engines as well as in-use engines. These include diesel engines of the two-stroke-per-cycle and four-stroke-per-cycle types.

What is claimed:

1. A process to produce aqueous hydrocarbon fuel comprising emulsifying components comprising:

(A) a liquid hydrocarbon fuel;

(B) at least one emulsifier, wherein the emulsifier comprises:

(i) at least one fuel-soluble product made by reacting at least one hydrocarbyl-substituted carboxylic acid acylating agent with ammonia or an amine, the hydrocarbyl substituent of said acylating agent having about 50 to about 500 carbon atoms;

(ii) at least one of an ionic or a nonionic compound having a hydrophilic-lipophilic balance (HLB) of about 1 to about 40;

(iii) a mixture of (ii) with (i);

(iv) a water-soluble compound selected from the group consisting of amine salts, ammonium salts, azide compounds, nitrate esters, nitramine, nitrocompounds, alkali metal salts, alkaline earth metal salts, in combination with (i), (ii), (iii), (v), (vii) or combinations thereof;

(v) the reaction product of polyacidic polymer with at least one fuel soluble product made by reacting at least one hydrocarbyl-substituted carboxylic acid acylating agent with ammonia, an amine, a polyamine, or hydroxy alkyl amines;

(vi) an amino alkylphenol which is made by reacting an alkylphenol, an aldehyde and an amine, resulting in an amino alkylphenol; or (vii) the combination of (vi) with (i), (ii), (iii), (iv), (v) or combinations thereof;

(C) a reactant emulsion comprising a water in oil emulsion of a liquid hydrocarbon and at least one emulsifier wherein the liquid hydrocarbon fuel and at least one emulsifier are selected from the group of the same, similar, or different liquid hydrocarbon fuel than the one used in step (A) and at least one emulsifier disclosed in step B; and (D) a water mixture selected from the group comprising water, water antifreeze, water ammonium salt, water antifreeze ammonium nitrate mixture, and combinations thereof, under emulsification conditions wherein the ratio of hydrocarbon fuel, emulsifier and water to reactant emulsion is in the range of about 1% to about 99% by weight hydrocarbon fuel, emulsifier and water to about 99% to about 1% by weight reactant emulsifier and wherein the emulsification shear rate results in an emulsion having a particle size having a mean diameter of less than 1.0 micron.

2. The process of claim 1 wherein the resulting emulsion has a particle size having a mean diameter in the range of about 1.0 micron to about 0.1 micron.

3. The process of claim 1 wherein about 50% to about 90% by weight of the hydrocarbon fuel, about 0.1% to about 25% by weight of the emulsifier, about 1% to about 90% by weight of the reactant emulsion, and about 1% to about 90% by weight of the water, wherein the water contains about 0% to about 10% by weight of water-soluble additives are added to a vessel and wherein the ratio of hydrocarbon fuel, emulsifier and water to reactant emulsion is about 50% by weight hydrocarbon fuel, emulsifier and water to about 50% by weight reactant emulsion.

4. The process of claim 3 wherein the ratio of hydrocarbon fuel, emulsifier and water to reactant emulsion is about 40% to about 60% by weight hydrocarbon fuel, emulsifier and water to about 60% to about 40% by weight reactant emulsion.

5. The process of claim 3 wherein the ratio of hydrocarbon fuel, emulsifier and water to reactant emulsion is about 15% to about 85% by weight hydrocarbon fuel, emulsifier and water to about 85% to about 15% by weight reactant emulsion.

6. The process of claim 1 wherein the emulsifier is selected from the group consisting of a water-soluble compound selected from the group consisting of amine salts, ammonium salts, azide compounds, nitrate esters, nitramine, nitrocompounds, alkali metal salts, alkaline earth metal salts, in combination with (iii).

7. The process of claim 6 wherein the water-soluble compound is ammonium nitrate.

8. The process of claim 1 wherein the components are emulsified in a batch process for about 1 to about 20 tank turnovers at a temperature in the range of about ambient temperature to about 212° F. and at a pressure in the range of about atmospheric to about 10 atmospheres, resulting in a stable aqueous hydrocarbon fuel emulsion.

9. The process of claim 1 wherein the process is a continuous process and wherein the feeds of hydrocarbon fuel, emulsifier, reactant emulsion and the water are introduced as feeds selected from the group consisting of discreet feeds and combinations of discreet feeds and combinations thereof to form a homogeneous aqueous hydrocarbon fuel emulsion and wherein the process occurs at a temperature in the range of ambient temperature to about 212° F. and at a pressure in the range of about atmospheric pressure to about 500 psi.

10. The process of claim 1 wherein the emulsification occurs at a shear rate in the range of greater than $0\ s^{-1}$ to about $500,000\ s^{-1}$ of shearing.

11. The process of claim 1 wherein the emulsification occurs at a shear rate in the range of about $20,000\ s^{-1}$ to about $200,000\ s^{-}$shearing.

12. The process of claim 1 wherein the emulsification occurs at a shear rate in the range of $25,000\ s^{-1}$ to about $125,000\ s^{-1}$ of shearing.

13. The process of claim 8 wherein at least one to five emulsification steps in series is employed in the continuous process.

14. The process of claim 9 wherein at least one to five emulsification steps in series is employed in the continuous process.

15. The process of claim 13 wherein there is no aging of the hydrocarbon fuel water emulsion between each emulsification step.

16. The process of claim 14 wherein the emulsion flows from one emulsification step to the next emulsification step in less than 5 minutes.

17. The process of claim 14 wherein the emulsion flows from one emulsification step to the next emulsification step in less than 3 minutes.

18. The process of claim 14 wherein the emulsion flows from one emulsification step to the next emulsification step in less than 1 minute.

19. The process of claim 14 wherein the emulsion flows from one emulsification step to the next emulsification step in less than 30 seconds.

20. The process of claim 9 wherein the reactant emulsion is formed from recycling the emulsion hydrocarbon fuel emulsion made in a continuous process.

21. The process of claim 8 wherein the reactant emulsion is formed from recycling the emulsion hydrocarbon fuel made in a batch process.

22. The process of claim 1 wherein the reactant emulsion comprises about 50% to about 99% by weight hydrocarbon fuel and about 0.05% to about 25% by weight of at least one emulsifier.

23. The process of claim 1 wherein the reactant emulsion is selected from the group that is the same, similar or different emulsion then the aqueous hydrocarbon fuel.

* * * * *